US012718065B2

(12) United States Patent
Maji

(10) Patent No.: US 12,718,065 B2
(45) Date of Patent: Aug. 25, 2026

(54) MIXED-PRECISION DEEP NEURAL NETWORK ENSEMBLE

(71) Applicant: Arm Limited, Cambridge (GB)

(72) Inventor: Partha Prasun Maji, Cambridge (GB)

(73) Assignee: Arm Limited, Cambridge (GB)

( * ) Notice: Subject to any disclaimer, the term of this patent is extended or adjusted under 35 U.S.C. 154(b) by 530 days.

(21) Appl. No.: 18/033,180

(22) PCT Filed: Dec. 10, 2021

(86) PCT No.: PCT/GB2021/053255
§ 371 (c)(1),
(2) Date: Apr. 21, 2023

(87) PCT Pub. No.: WO2022/144536
PCT Pub. Date: Jul. 7, 2022

(65) Prior Publication Data

US 2023/0394281 A1 Dec. 7, 2023

(30) Foreign Application Priority Data

Dec. 30, 2020 (GB) .................................... 2020755

(51) Int. Cl.
*G06N 3/0455* (2023.01)
*G06N 3/084* (2023.01)

(52) U.S. Cl.
CPC .......... *G06N 3/0455* (2023.01); *G06N 3/084* (2013.01)

(58) Field of Classification Search
CPC ........ G06N 3/0464; G06N 3/045; G06N 3/08; G06N 3/063; G06N 3/084; G06N 3/09;
(Continued)

(56) References Cited

U.S. PATENT DOCUMENTS

2019/0384304 A1* 12/2019 Towal .................. G05D 1/0221
2020/0134461 A1* 4/2020 Chai .................... G06N 3/0464

OTHER PUBLICATIONS

Balaji Lakshminarayanan, Alexander Pritzel, and Charles Blundell. 2017. Simple and scalable predictive uncertainty estimation using deep ensembles. In Proceedings of the 31st International Conference on Neural Information Processing Systems (NIPS'17). Curran Associates Inc., Red Hook, NY, USA, 6405-6416.

(Continued)

*Primary Examiner* — Shyue Jiunn Hwa
(74) *Attorney, Agent, or Firm* — Leveque Intellectual Property Law, P.C.

(57) ABSTRACT

A hardware accelerator and method for a mixed-precision deep neural network (DNN) ensemble are provided. The hardware accelerator includes a DNN primary module, a number of DNN auxiliary modules and a fusion module. The DNN primary module processes a DNN primary model having a primary precision level, and each DNN auxiliary module processes a DNN auxiliary model having an auxiliary precision level less than the primary precision level. The DNN primary model and each DNN auxiliary model are configured to determine a mean predicted category and a variance based on input data. The fusion module is configured to receive the mean predicted categories and variances from the DNN primary model and each DNN auxiliary model, determine an average mean predicted category and (Continued)

an average variance based on the mean predicted categories and variances, and output the average mean predicted category and the average variance.

20 Claims, 5 Drawing Sheets

(58) Field of Classification Search
CPC ........ G06N 3/048; G06N 3/0495; G06N 3/04; G06N 20/00; G06N 3/082; G06N 3/044; G06N 3/047; G06N 5/01; G06N 3/088; G06N 5/046; G06N 7/01; G06N 20/10; G06N 5/04; G06N 3/065; G06N 5/045; G06N 3/006; G06N 3/02; G06N 3/086; G06N 3/092; G06N 7/08; G06F 7/483; G06F 1/26; G06F 13/364; G06F 13/4291; G06F 30/20; G06F 7/5443; G06F 9/5027; G06F 16/2379; G06F 16/9024; G06F 5/012; G06F 7/4876; G06F 7/49915; G06F 7/49947; G06F 9/30014; G06F 9/30036; G06F 9/3016
See application file for complete search history.

(56) References Cited

OTHER PUBLICATIONS

GB2020755.1, Combined Search and Examination Report, UK Intellectual Property Office, Dec. 30, 2022.
PCT/GB2021/053255, PCT International Search Report and Written Opinion, European Patent Office, Mar. 23, 2022.
Sen, Sanchari & Ravindran, Balaraman & Raghunathan, Anand, EMPIR: Ensembles of Mixed Precision Deep Networks for Increased Robustness against Adversarial Attacks, https://arxiv.org/abs/2004.10162, Apr. 2020.
Wikipedia, Kalman Filter, https://wikipedia.org/w/index.php?title=Kalman_filter&oldid=480213451 section "Overview of the Calculation", 2012.
Yu, Haichao, Haoxiang Li, Humphrey Shi, Thomas S. Huang and Gang Hua. "Any-Precision Deep Neural Networks." AAAI Conference on Artificial Intelligence (U.S. Appl. No. 11/172,019).
Zhang Li, Wang Mingliang, Liu Mingxia, Zhang Daoqiang, A Survey on Deep Learning for Neuroimaging-Based Brain Disorder Analysis, Frontiers in Neuroscience, vol. 14, Oct. 8, 2020.

* cited by examiner

MIXED-PRECISION DEEP NEURAL NETWORK ENSEMBLE

BACKGROUND

The present disclosure relates to computer systems. More particularly, the present disclosure relates to computer systems including artificial neural networks (ANNs).

Prediction is a fundamental element of many classification networks that include machine learning (ML), such as, for example, ANNs with a single hidden layer (i.e., shallow ANNs), deep neural networks (DNNs) such as ANNs with multiple hidden layers (i.e., deep ANNs), convolutional neural networks (CNNs), recurrent neural networks (RNNs), etc., support vector machines (SVMs), decision trees, Bayesian networks, etc. However, a classification network never achieves 100% prediction accuracy due to many reasons, such as, for example, insufficient data for a class, out of distribution (OOD) input data (i.e., data that do not belong to any of the classes), etc. Classification networks implemented in both hardware and software are also susceptible to hard and soft errors, which may worsen the prediction accuracy or lead to a fatal event. Generally, classification networks simply provide the "best" prediction based on the input data and the underlying training methodology and data.

Unfortunately, DNNs do not provide uncertainty estimates, and predictions from such models are often overfitted. And, while a Bayesian network is probabilistic in nature, a Bayesian network is hard to train, contains a significant number of parameters and does not scale for large-scale problems. In the presence of the out-of-distribution data, data-shift and adversarial attack, the lack of an uncertainty estimate becomes a serious challenge which may lead to a fatal failure for many systems in general, and for safety-critical systems in particular (e.g. health-care, autonomous driving, various industrial applications, etc.).

DETAILED DESCRIPTION

Figure 1:
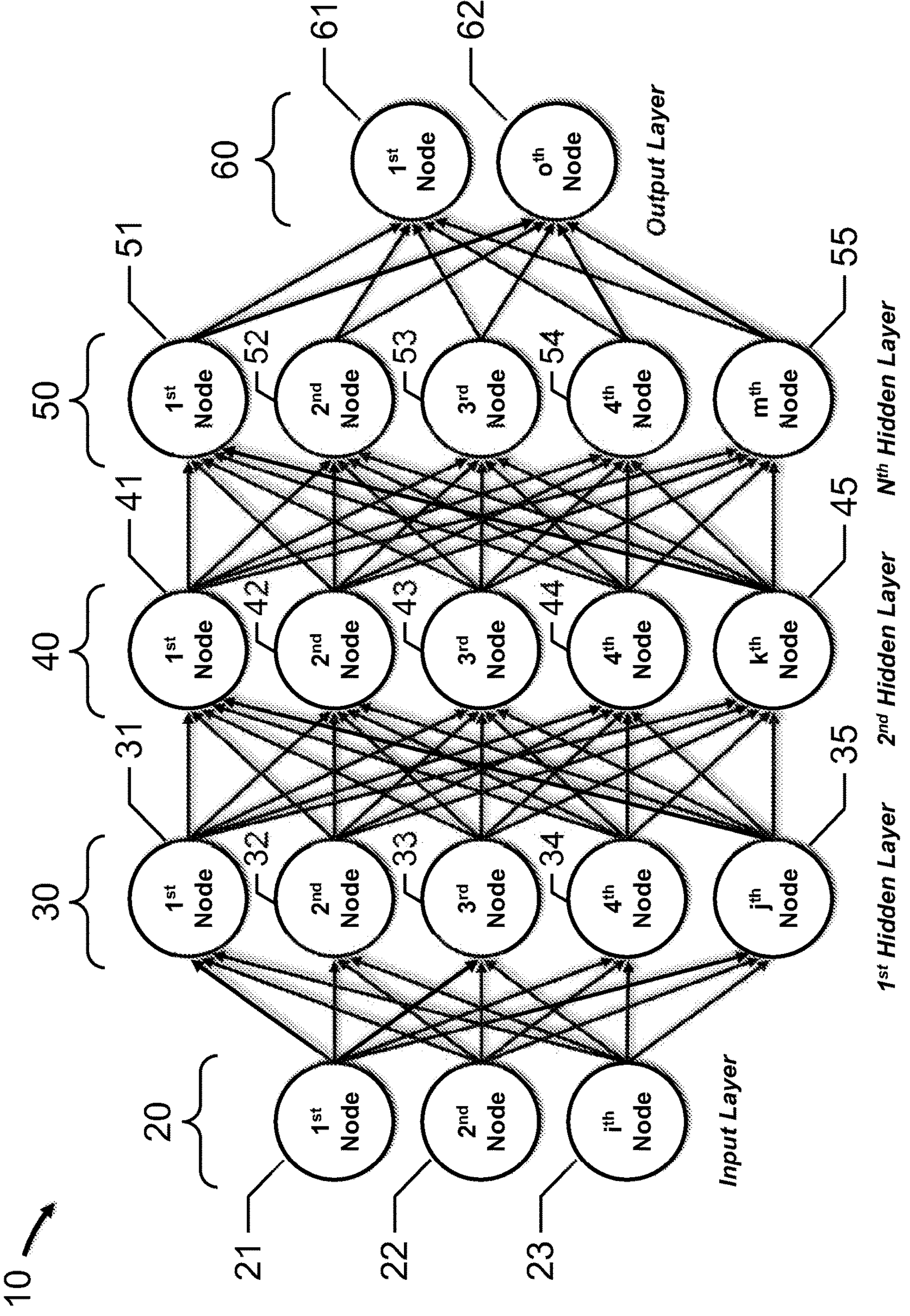
FIG. 1 depicts an ANN, in accordance with an embodiment of the present disclosure.

Embodiments of the present disclosure will now be described with reference to the drawing figures, in which like reference numerals refer to like parts throughout.

Embodiments of the present disclosure advantageously provide a mixed-precision DNN ensemble that includes a DNN primary model and a number of DNN auxiliary models. The prediction generated by the DNN primary model is combined with the predictions generated by the DNN auxiliary models to produce a prediction that includes an uncertainty estimate. The DNN primary model has a primary precision level, while the DNN auxiliary models have an auxiliary precision level that is less than the primary precision level.

In one embodiment, a hardware accelerator for a mixed-precision deep neural network (DNN) ensemble includes a DNN primary module, a number of DNN auxiliary modules and a fusion module coupled to the DNN primary module and the DNN auxiliary modules. The DNN primary module processes a DNN primary model having a primary precision level, and is configured to determine a mean predicted category and a variance based on input data, and to output the mean predicted category and the variance. Each DNN auxiliary module processes a DNN auxiliary model having an auxiliary precision level less than the primary precision level, and is configured to determine a mean predicted category and a variance based on the input data, and to output the mean predicted category and the variance. The fusion module is configured to receive, from the DNN primary module and the DNN auxiliary modules, the mean predicted categories and the variances, determine an average mean predicted category and an average variance based on the mean predicted categories and the variances, and output the average mean predicted category and the average variance.

An ANN models the relationships between input data or signals and output data or signals using a network of interconnected nodes that is trained through a learning process. The nodes are arranged into various layers, including, for example, an input layer, one or more hidden layers, and an output layer. The input layer receives input data, such as, for example, image data, and the output layer generates output data, such as, for example, a probability that the image data contains a known object. Each hidden layer provides at least a partial transformation of the input data to the output data. A DNN has multiple hidden layers in order to model complex, nonlinear relationships between input data and output data.

In a fully-connected, feedforward ANN, each node is connected to all of the nodes in the preceding layer, as well as to all of the nodes in the subsequent layer. For example, each input layer node is connected to each hidden layer node, each hidden layer node is connected to each input layer node and each output layer node, and each output layer node is connected to each hidden layer node. Additional hidden layers are similarly interconnected. Each connection has a weight value, and each node has an activation function, such as, for example, a linear function, a step function, a sigmoid function, a tanh function, a rectified linear unit (ReLU) function, etc., that determines the output of the node based on the weighted sum of the inputs to the node. The input data propagates from the input layer nodes, through respective connection weights to the hidden layer nodes, and then through respective connection weights to the output layer nodes.

More particularly, at each input node, input data is provided to the activation function for that node, and the output of the activation function is then provided as an input data value to each hidden layer node. At each hidden layer node, the input data value received from each input layer node is multiplied by a respective connection weight, and the resulting products are summed or accumulated into an activation value that is provided to the activation function for that node. The output of the activation function is then provided as an input data value to each output layer node. At each output layer node, the output data value received from each hidden layer node is multiplied by a respective connection weight, and the resulting products are summed or accumulated into an activation value that is provided to the activation function for that node. The output of the activation function is then provided as output data. Additional hidden layers may be similarly configured to process data.

A multi-layer perceptron (MLP) is an ANN that has an input layer, an output layer and one or more hidden layers. MLPs may be used for natural language processing applications, such as machine translation, speech recognition, etc. Other ANNs include recurrent neural networks (RNNs), long short-term memories (LSTMs), sequence-to-sequence models that include an encoder RNN and a decoder RNN, shallow neural networks, etc.

A CNN is a variation of an MLP that may be used for classification or recognition applications, such as image recognition, speech recognition, etc. A CNN has an input layer, an output layer and multiple hidden layers including convolutional layers, pooling layers, normalization layers, fully-connected layers, etc. Each convolutional layer applies a sliding dot product or cross-correlation to an input volume, applies an activation function to the results, and then provides the activation or output volume to the next layer. Convolutional layers typically use the ReLU function as the activation function. In certain embodiments, the activation function is provided in a separate activation layer, such as, for example, a ReLU layer. A pooling layer reduces the dimensions of the output volume received from the preceding convolutional layer, and may calculate an average or a maximum over small clusters of data, such as, for example, 2×2 matrices. In certain embodiments, a convolutional layer and a pooling layer may form a single layer of a CNN. The fully-connected layers follow the convolutional and pooling layers, and include a flatten layer and a classification layer, followed by a normalization layer that includes a normalization function, such as the SoftMax function. The output layer follows the last fully-connected layer; in certain embodiments, the output layer may include the normalization function.

FIG. 1 depicts ANN 10, in accordance with an embodiment of the present disclosure.

ANN 10 includes input layer 20, one or more hidden layers 30, 40, 50, etc., and output layer 60. Input layer 20 includes one or more input nodes 21, 22, 23, etc. Hidden layer 30 includes one or more hidden nodes 31, 32, 33, 34, 35, etc. Hidden layer 40 includes one or more hidden nodes 41, 42, 43, 44, 45, etc. Hidden layer 50 includes one or more hidden nodes 51, 52, 53, 54, 55, etc. Output layer 60 includes one or more output nodes 61, 62, etc. Generally, ANN 10 includes N hidden layers, input layer 20 includes "i" nodes, hidden layer 30 includes "j" nodes, hidden layer 40 includes "k" nodes, hidden layer 50 includes "m" nodes, and output layer 60 includes "o" nodes. Many variations of input, hidden and output layers are clearly possible, including hidden layers that are locally-connected, rather than fully-connected, to one another. An ANN with a single hidden layer 30 is a shallow ANN, while an ANN with multiple hidden layers 30, 40, etc. is a deep ANN, i.e., a DNN.

Training an ANN includes optimizing the connection weights between nodes by minimizing the prediction error of the output data until the ANN achieves a particular level of accuracy. One method is backpropagation, or backward propagation of errors, which iteratively and recursively determines a gradient descent with respect to the connection weights, and then adjusts the connection weights to improve the performance of the network.

Figure 2:
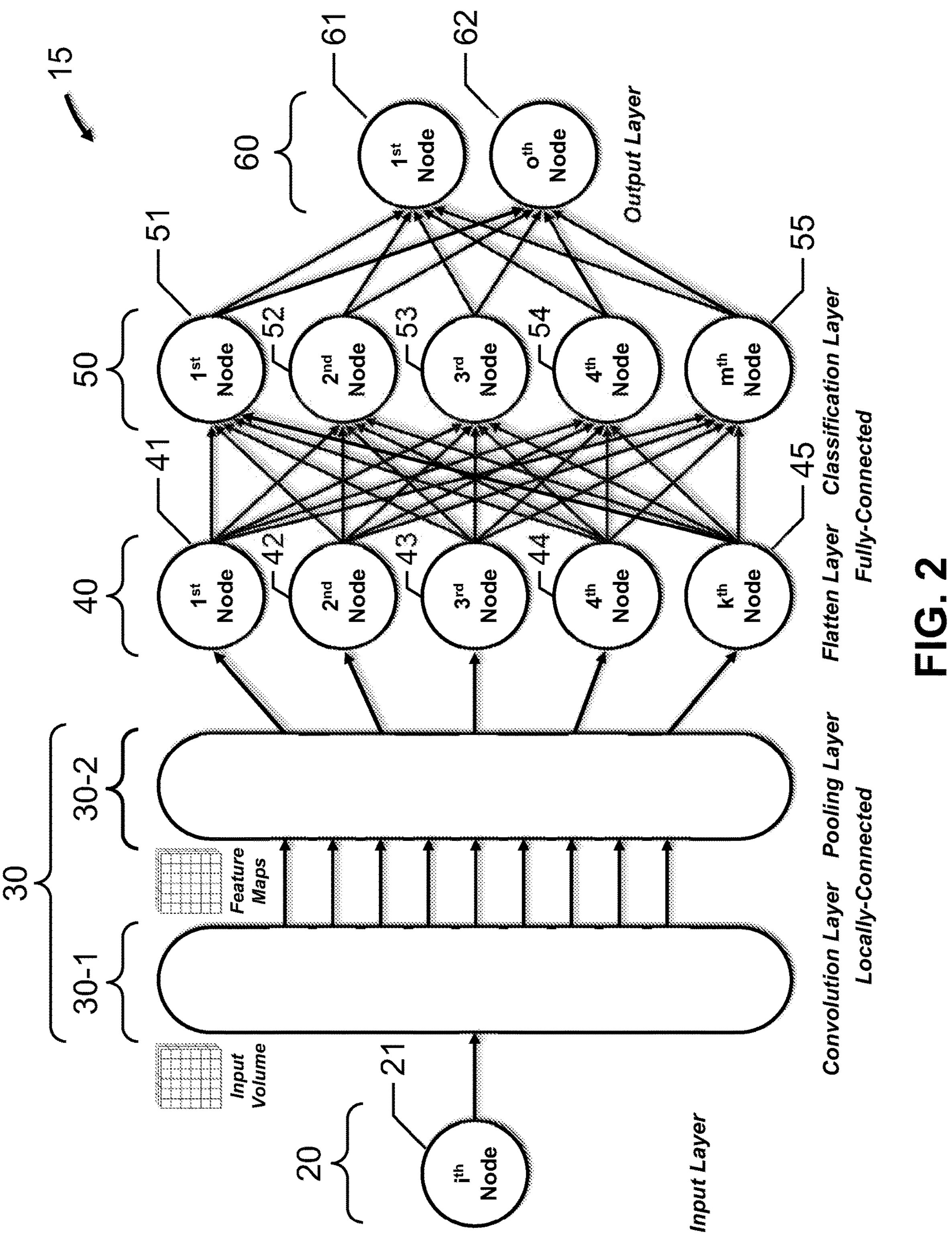
FIG. 2 depicts a CNN, in accordance with an embodiment of the present disclosure.

FIG. 2 depicts CNN 15, in accordance with an embodiment of the present disclosure. CNN 15 includes input layer 20, one or more hidden layers, such as convolutional layer 30-1, pooling layer 30-2, hidden (flatten) layer 40, hidden (classification) layer 50, etc., and output layer 60. Many other variations of input, hidden and output layers are contemplated. Because a CNN includes multiple hidden layers, a CNN is deep neural network, i.e., DNN.

Input layer 20 includes one or more input nodes 21, etc., that present the input data, such as a color image, as an input volume to the first convolutional layer, e.g., convolutional layer 30-1. The input volume is a three-dimensional matrix that has a width, a height and a depth. For example, input data that represent a color image may be presented as an input volume that is 512 pixels×512 pixels×3 channels (red, green, blue); other input volume dimensions may also be used, such as 32×32×3, 64×64×3, 128×128×3, etc., 32×32×1, 64×64×1, 128×128×1, 512×512×1, etc.

Convolutional layer 30-1 is locally-connected to input layer 20, and includes a plurality of nodes that are connected to local regions in the input volume (not depicted for clarity). For a CNN that uses a standard convolution, each node computes a dot product between the node's weights and the respective local region of the input volume to generate one element of an output volume. An activation function and a bias may be applied to each element of the output volume, and the output volume is then provided as the input volume to the next layer. The activation function and bias may be applied by each convolutional layer node or by the nodes of a subsequent locally-connected layer, such as an ReLU layer.

Pooling layer 30-2 is locally-connected to convolutional layer 30-1, and includes a plurality of nodes that are connected to local regions in the input volume (not depicted for clarity). Pooling layer 30-2 also produces an output volume that is provided as the input volume to the subsequent layer, such as, for example, another convolutional layer 30-1, a flatten layer 40, etc. In certain embodiments, convolutional layer 30-1 and pooling layer 30-2 form a single hidden layer 30. Similarly, in certain embodiments, convolutional layer 30-1, a ReLU layer and pooling layer 30-2 form a single hidden layer 30. Generally, the output volumes of the convolutional and pooling layers may be described as output feature maps, and one or more single hidden layers 30 form a feature learning portion of CNN 15.

Hidden layer 40 is a "flatten" layer that is locally-connected to pooling layer 30-2, and includes one or more hidden (flatten) nodes 41, 42, 43, 44, 45, etc. Hidden (flatten) layer 40 "flattens" the output volume produced by the preceding pooling layer 30-2 into a column vector, which is provided to the subsequent, fully-connected hidden layer 50.

Hidden layer 50 is a classification layer that is fully-connected to hidden (flatten) layer 40, and includes one or more hidden (classification) nodes 51, 52, 53, 54, 55, etc.

Output layer 60 includes one or more output nodes 61, 62, etc., and is fully-connected to hidden (classification) layer 50. Fully-connected output layer 60 receives the classification results output by hidden (classification) layer 50, and each node outputs a predicted class score. A normalization function, such as a Softmax function, may be applied to the predicted class scores by output layer 60, or, alternatively, by an additional layer interposed between hidden (classification) layer 50 and output layer 60.

Similar to ANNs, training a CNN includes optimizing the connection weights between nodes by minimizing the prediction error of the output data until the CNN achieves a particular level of accuracy. As noted above, backpropagation may be used to iteratively and recursively determines a gradient descent with respect to the connection weights, and then adjusts the connection weights to improve the performance of the network. Matrix multiplication operations, and, more particularly, MAC operations, are used extensively by CNNs, as well as other ANNs.

Figure 3:
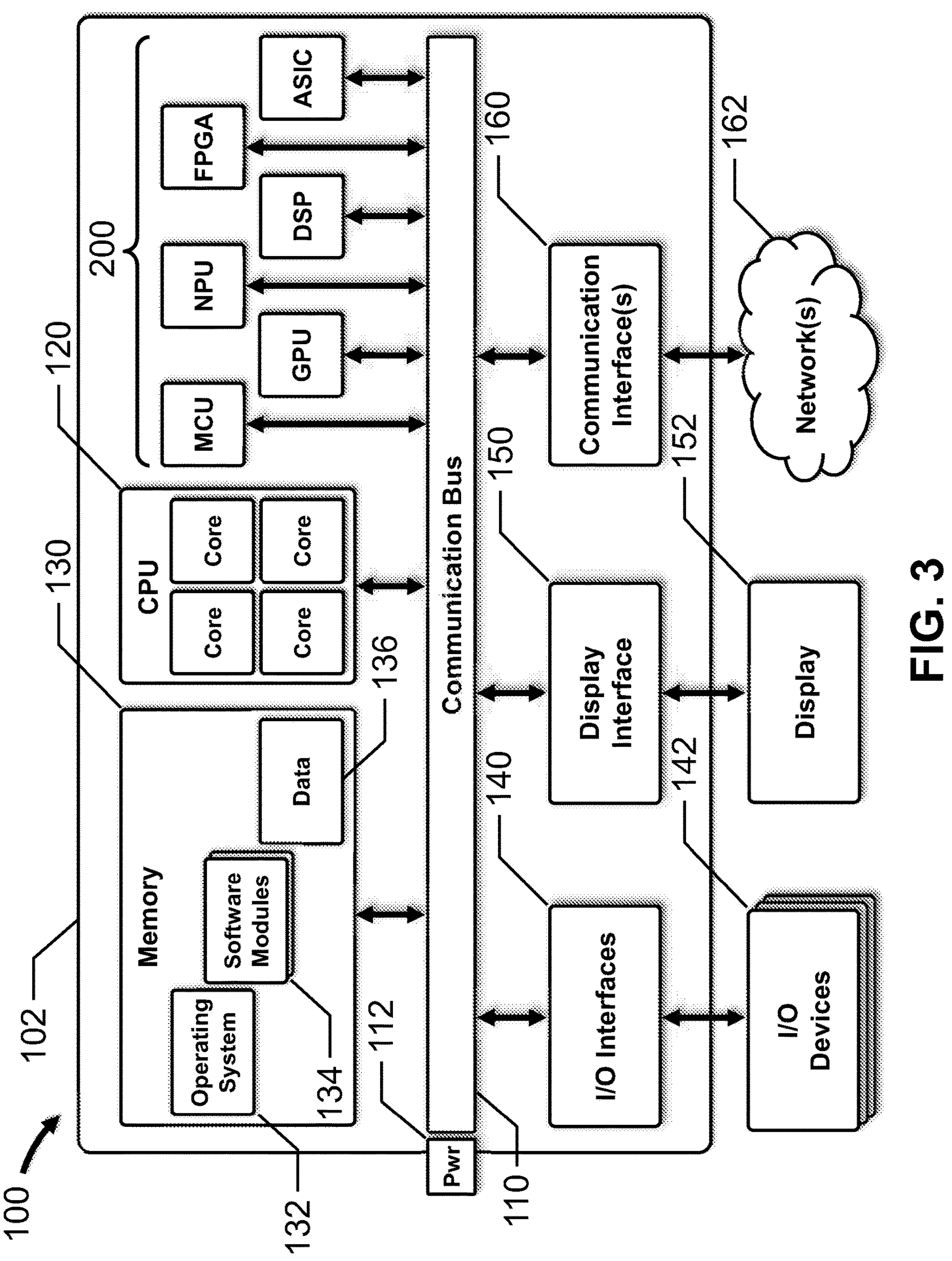
FIG. 3 depicts a block diagram of a system, in accordance with an embodiment of the present disclosure.

FIG. 3 depicts a block diagram of system 100, in accordance with an embodiment of the present disclosure.

System 100 includes computer 102, I/O devices 142 and display 152. Computer 102 includes communication bus 110 coupled to one or more processors 120, memory 130, I/O interfaces 140, display interface 150, one or more communication interfaces 160, and one or more HAs 200. Generally, I/O interfaces 140 are coupled to I/O devices 142 using a wired or wireless connection, display interface 150 is coupled to display 152, and communication interface 160 is connected to network 162 using a wired or wireless connection. In some embodiments, certain components of computer 102 are implemented as a system-on-chip (SoC); in other embodiments, computer 102 may be hosted on a traditional printed circuit board, motherboard, etc.

In some embodiments, system 100 is an embedded system in which one or more of the components depicted in FIG. 3 are not present, such as, for example, I/O interfaces 140, I/O devices 142, display interface 150, display 152, etc. Additionally, certain components, when present, may be optimized based on various design constraints, such as, for example, power, area, etc., such as, for example, HA 200.

Communication bus 110 is a communication system that transfers data between processor 120, memory 130, I/O interfaces 140, display interface 150, communication interface 160, HAs 200, as well as other components not depicted in FIG. 3. Power connector 112 is coupled to communication bus 110 and a power supply (not shown). In some embodiments, communication bus 110 is a network-on-chip (NoC).

Processor 120 includes one or more general-purpose or application-specific microprocessors that executes instructions to perform control, computation, input/output, etc. functions for system 100. Processor 120 may include a single integrated circuit, such as a micro-processing device, or multiple integrated circuit devices and/or circuit boards working in cooperation to accomplish the functions of processor 120. Additionally, processor 120 may include multiple processing cores, as depicted in FIG. 3. Generally, system 100 may include one or more processors 120, each containing one or more processing cores as well as various other modules.

In some embodiments, system 100 may include 2 processors 120, each containing multiple processing cores. For example, one processor 120 may be a high performance processor containing 4 "big" processing cores, e.g., Arm Cortex-A73, Cortex-A75, Cortex-A76, etc., while the other processor 120 may be a high efficiency processor containing 4 "little" processing cores, e.g., Arm Cortex-53, Arm Cortex-55, etc. In this example, the "big" processing cores include a memory management unit (MMU). In other embodiments, system 100 may be an embedded system that includes a single processor 120 with one or more processing cores, such as, for example, an Arm Cortex-M core. In these embodiments, processor 120 typically includes a memory protection unit (MPU).

In many embodiments, processor 120 may also be configured to execute classification-based machine learning (ML) models, such as, for example, ANNs, DNNs, CNNs, RNNs, SVM, Naïve Bayes, etc. In these embodiments, processor 120 may provide the same functionality as a hardware accelerator, such as HA 200. For example, system 100 may be an embedded system that does not include HA 200.

In addition, processor 120 may execute computer programs or modules, such as operating system 132, software modules 134, etc., stored within memory 130. For example, software modules 134 may include an autonomous vehicle application, a robotic application, such as, for example, a robot performing a surgical process, working with humans in a collaborative environment, etc., which may include a classification network, such as, for example, an ANN, a CNN, an RNN, a BNN, an SVM, Decision Trees, Bayesian networks, Naïve Bayes, etc.

Generally, storage element or memory 130 stores instructions for execution by processor 120 and data. Memory 130 may include a variety of non-transitory computer-readable medium that may be accessed by processor 120. In various embodiments, memory 130 may include volatile and non-volatile medium, non-removable medium and/or removable medium. For example, memory 130 may include any combination of random access memory (RAM), DRAM, SRAM, ROM, flash memory, cache memory, and/or any other type of non-transitory computer-readable medium.

Memory 130 contains various components for retrieving, presenting, modifying, and storing data. For example, memory 130 stores software modules that provide functionality when executed by processor 120. The software modules include operating system 132 that provides operating system functionality for system 100. Software modules 134 provide various functionality, such as image classification using CNNs, etc. Data 136 may include data associated with operating system 132, software modules 134, etc.

I/O interfaces 140 are configured to transmit and/or receive data from I/O devices 142. I/O interfaces 140 enable connectivity between processor 120 and I/O devices 142 by encoding data to be sent from processor 120 to I/O devices 142, and decoding data received from I/O devices 142 for processor 120. Generally, data may be sent over wired and/or wireless connections. For example, I/O interfaces 140 may include one or more wired communications interfaces, such as USB, Ethernet, etc., and/or one or more wireless communications interfaces, coupled to one or more antennas, such as WiFi, Bluetooth, cellular, etc.

Generally, I/O devices 142 provide input to system 100 and/or output from system 100. As discussed above, I/O devices 142 are operably connected to system 100 using a wired and/or wireless connection. I/O devices 142 may include a local processor coupled to a communication interface that is configured to communicate with system 100 using the wired and/or wireless connection. For example, I/O devices 142 may include a keyboard, mouse, touch pad, joystick, etc., sensors, actuators, etc.

Display interface 150 is configured to transmit image data from system 100 to monitor or display 152.

Communication interface 160 is configured to transmit data to and from network 162 using one or more wired and/or wireless connections. Network 162 may include one or more local area networks, wide area networks, the Internet, etc., which may execute various network protocols, such as, for example, wired and/or wireless Ethernet, Bluetooth, etc. Network 162 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

HAs 200 are configured to execute, inter alia, classification networks, such as, for example, ANNs, CNNs, etc., in support of various applications embodied by software modules 134. Generally, HAs 200 include one or more processors, coprocessors, processing engines (PEs), compute engines (CEs), etc., such as, for example, CPUs, GPUs, NPUs (e.g., the ARM ML Processor), DSPs, field programmable gate arrays (FPGAs), application specific integrated circuits (ASICs), controllers, microcontrollers, matrix multiplier circuits, MAC arrays, etc. HAs 200 also include a communication bus interface as well as non-volatile and/or volatile memories, such as, for example, ROM, flash memory, SRAM, DRAM, etc.

In many embodiments, HA 200 receives the ANN model and weights from memory 130 over communication bus 110 for storage in local volatile memory (e.g., SRAM, DRAM, etc.). In other embodiments, HA 200 receives a portion of the ANN model and weights from memory 130 over communication bus 110. In these embodiments, HA 200 determines the instructions needed to execute the ANN model or ANN model portion. In other embodiments, the ANN model (or ANN model portion) simply includes the instructions needed to execute the ANN model (or ANN model portion). In these embodiments, processor 120 determines the instructions needed to execute the ANN model, or, processor 120 divides the ANN model into ANN model portions, and then determines the instructions needed to execute each ANN model portion. The instructions are then provided to HA 200 as the ANN model or ANN model portion.

In further embodiments, HA 200 may store ANN models, instructions and weights in non-volatile memory. In some embodiments, the ANN model may be directly implemented in hardware using DSPs, FPGAs, ASICs, controllers, microcontrollers, adder circuits, multiply circuits, MAC circuits, etc. Generally, HA 200 receives input data from memory 130 over communication bus 110, and transmit output data to memory 130 over communication bus 110. In some embodiments, the input data may be associated with a layer (or portion of a layer) of the ANN model, and the output data from that layer (or portion of that layer) may be transmitted to memory 130 over communication bus 110.

For example, the ARM ML Processor supports a variety of ANNs, CNNs RNNs, etc., for classification, object detection, image enhancements, speech recognition and natural language understanding. The ARM ML Processor includes a control unit, a direct memory access (DMA) engine, local memory and 16 CEs. Each CE includes, inter alia, a MAC engine that performs convolution operations, a programmable layer engine (PLE), local SRAM, a weight decoder, a control unit, a direct memory access (DMA) engine, etc. Each MAC engine performs up to eight 16-wide dot products with accumulation. Generally, the PLE performs non-convolution operations, such as, for example, pooling operations, ReLU activations, etc. Each CE receives input feature maps (IFMs) and weights sets over the NoC and stores them in local SRAM. The MAC engine and PLE process the IFMs to generate the output feature maps (OFMs), which are also stored in local SRAM prior to transmission over the NoC.

In other embodiments, HA 200 may also include specific, dedicated hardware components that are configured to execute a pre-trained, pre-programmed, hardware-based classification network. These hardware components may include, for example, DSPs, FPGAs, ASICs, controllers, microcontrollers, multiply circuits, add circuits, MAC circuits, etc. The pre-trained, pre-programmed, hardware-based classification network receives input data, such as IFMs, and outputs one or more predictions. For hardware-based classification networks that include small ANNs, the weights, activation functions, etc., are pre-programmed into the hardware components. Generally, hardware-based classification networks provide certain benefits over more traditional hardware accelerators that employ CPUs, GPUs, PE arrays, CE arrays, etc., such as, for example, processing speed, efficiency, reduced power consumption, reduced area, etc. However, these benefits are achieved at a price—the size of the classification network is typically small, and there is little (to no) ability to upgrade or expand the hardware components, circuits, etc. in order to update the classification network.

In many embodiments, HA 200 includes one or more processors, coprocessors, PEs, CEs, etc., that are configured to execute two or more large, main classification networks as well as one or more small, expert classification networks. In some embodiments, the expert classification networks may be pre-trained, pre-programmed, hardware-based classification networks. In these embodiments, in addition to the processors, coprocessors, PEs, CEs, etc. that are configured to execute the main classification network, HA 200 includes additional hardware components, such as DSPs, FPGAs, ASICs, controllers, microcontrollers, multiply circuits, add circuits, MAC circuits, etc., that are configured to execute each expert classification network as a separate, hardware-based classification network.

Attempts at mitigating the adverse effects of the lack of an uncertainty estimate included calibrating the DNN model with new data prior to deployment, and then periodically recalibrating the DNN model after deployment. However, calibration is a cumbersome process, recalibration is extremely costly and often ineffective, and these attempts have proved unsuccessful even when possible.

Embodiments of the present disclosure advantageously provide a mixed-precision DNN ensemble that includes a DNN primary model and a number of DNN auxiliary models. The prediction generated by the DNN primary model is combined with the predictions generated by the DNN auxiliary models to produce a prediction that includes an uncertainty estimate. The DNN primary model has a primary precision level, while the DNN auxiliary models have an auxiliary precision level that is less than the primary precision level.

The primary precision level may be expressed as N bits, the auxiliary precision level may be expressed as n bits, and $n<N$. In many embodiments $n=N/2$, while in other embodiments, $n \ll N$. In one embodiment, the DNN ensemble may generate an average predicted category during inference (i.e., $f_*$). In another embodiment, the DNN ensemble may generate an average mean predicted category and average variance during inference (i.e., $\mu_*$ and $\sigma_*^2$). In a further embodiment, the DNN ensemble may generate a Kalman filter state prediction during inference (i.e., $x_K$).

Figure 4:
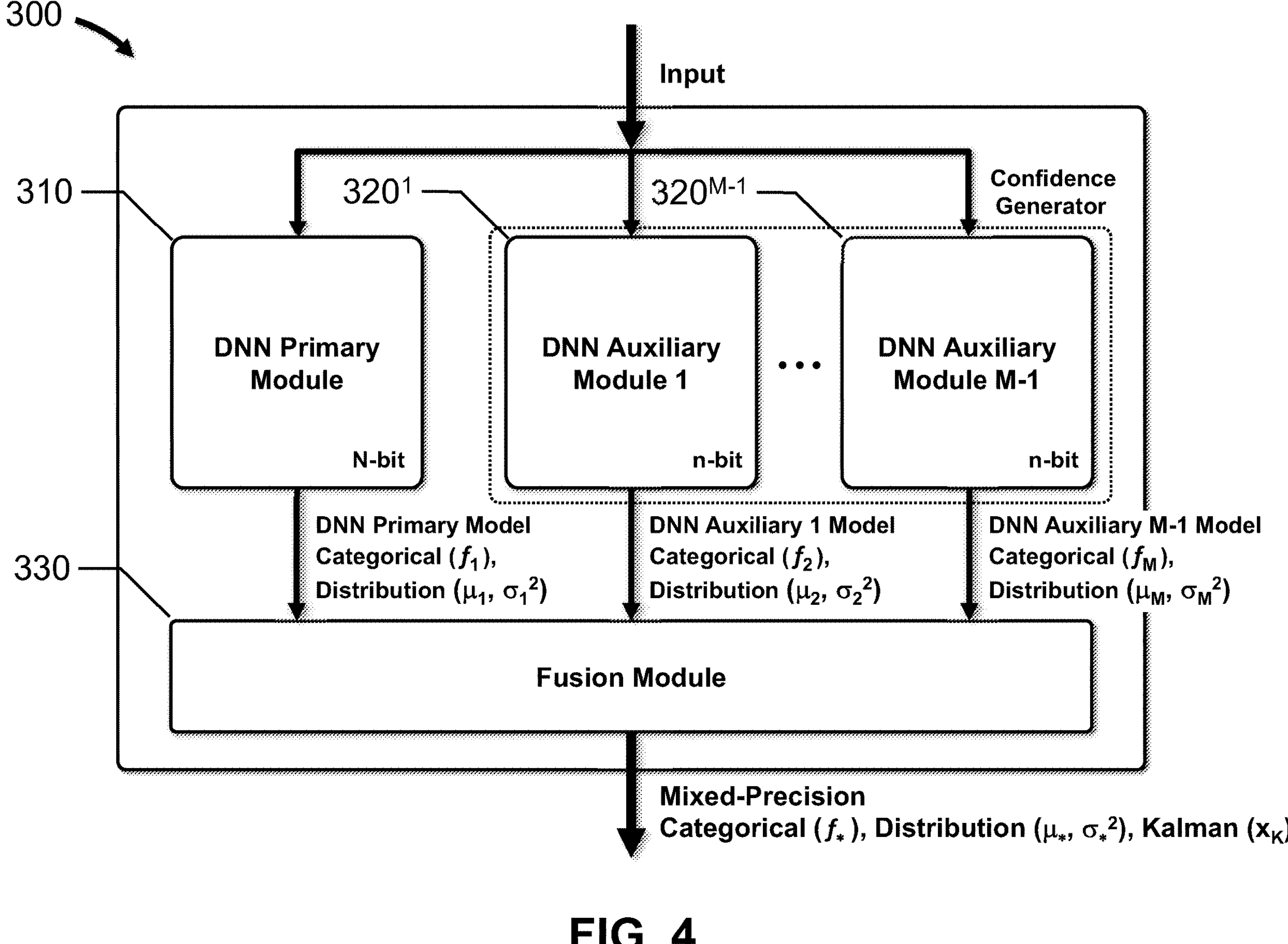
FIG. 4 depicts a block diagram of a mixed-precision DNN ensemble, in accordance with embodiments of the present disclosure.

FIG. 4 depicts a block diagram of a mixed-precision DNN ensemble 300, in accordance with embodiments of the present disclosure.

In many embodiments, mixed-precision DNN ensemble 300 may be executed by HA 200, while in other embodiments, mixed-precision DNN ensemble 300 may be executed by processor 120.

Mixed-precision DNN ensemble 300 includes DNN primary module 310, DNN auxiliary modules 320, and fusion module 330. Generally, each "module" may be a software module that is executed by a processor, a hardware module that includes bespoke electronic circuitry, or a combination of software that is executed by a processor and hardware that is coupled to the processor. For example, DNN primary module 310, DNN auxiliary modules 320 and fusion module 330 may be software modules that are stored in non-volatile local memory of HA 200, or, alternatively, stored in memory 130 and sent to HA 200 via communication bus 110, as discussed above.

DNN primary module 310 includes DNN primary model with a primary precision level of N bits. Each DNN auxiliary module 320 includes a DNN auxiliary model with an auxiliary precision level of n bits. For ease of illustration, the total number of number DNN primary and auxiliary modules of DNN auxiliary modules 320 may be generalized as M modules, which include DNN primary module 210 and DNN auxiliary modules $\mathbf{220}^1, \ldots, \mathbf{220}^{M-1}$. In many embodiments, the DNN primary model and the DNN auxiliary models are randomly initialized with different sets of parameters $\theta_i$ to capture the uncertainty in the DNN model space.

In many embodiments, the DNN primary model and the DNN auxiliary models have the same architecture but different precision levels, i.e., the same number of layers and the same number of nodes in each layer. Other configurations are also contemplated. More particularly, the activations and weights for the DNN primary model are N-bit elements, such as, for example, 16-bit integers, while the activations and weights for the DNN auxiliary models are n-bit elements, such as, for example, 8-bit integers. Generally, the available precision levels for the DNN primary model and the DNN auxiliary models may be presented as a set of bit lengths, i.e., N: {2, 4, 8, 16, 32, 64} and n: {2, 4, 8, 16, 32}, and, as long as n<N, any combination of primary and auxiliary precision levels may be used.

In certain embodiments, the DNN primary and auxiliary models include input layer 20, hidden layers 30, 40 and output layer 60. Input layer 20 includes one or more input nodes 21, 22, 23, etc. Hidden layer 30 includes one or more fully-connected hidden nodes 31, 32, 33, 34, 35, etc. Hidden layer 40 includes one or more fully-connected hidden nodes 41, 42, 43, 44, 45, etc. Output layer 60 includes one or two fully-connected, output nodes 61, 62. While a DNN model outputs a predicted class or category (i.e., f) based on the input data, the DNN primary and auxiliary models may also output statistical information, such as, for example, the mean of the predicted class or category and the variance (i.e., and 62). In one embodiment, output layer 60 includes node 61 that outputs the predicted class or category (e.g., f), while in another embodiment, output layer 60 includes nodes 61, 62 that output the mean of the predicted class or category and the variance (i.e., $\mu$ and $\sigma^2$), respectively.

Fusion module 330 receives and combines the output from DNN primary module 310 and DNN auxiliary modules 320 into a format that advantageously provides an indication of uncertainty associated with the predicted class or category. In one embodiment, fusion module 330 generates an average predicted category (i.e., $f_*$). In another embodiment, fusion module 330 generates an average mean predicted category and average variance (i.e., $\mu_*$ and $\sigma_*^2$). In a further embodiment, fusion module 330 generates a Kalman filter state prediction (i.e., $x_K$).

The average predicted category is given by Equation 1:

$$f_* = \frac{1}{M} \times \sum_{m=1}^{M} f_m \quad \text{Eq. 1}$$

where M is the number of DNN models, $f_*$ is the average predicted category for mixed-precision DNN ensemble 300, and $f_m$ is the predicted category for each DNN model. In this embodiment, each predicted category may be assigned a numeric value, and the average predicted category is the numerical average.

The average mean predicted category and average variance is given by Equation 2:

$$\mu_* = \frac{1}{M} \times \sum_{m=1}^{M} \mu_m, \text{ and} \quad \text{Eq. 2}$$

$$\sigma_*^2 = \frac{1}{M} \times \sum_{m=1}^{M} (\sigma_m^2 + \mu_m^2) - \mu_*^2$$

where M is the number of DNN models, $\mu_*$ is the average mean predicted category for mixed-precision DNN ensemble 300, $\mu_m$ is the mean predicted category for each DNN model, $$\sigma^2.$$

is the average variance for mixed-precision DNN ensemble 300, and $$\sigma_m^2$$

is the variance for each DNN model.

The Kalman filter state prediction is given by Equation 3:

$$x_K = \text{KalmanFilter}(f_m \text{ or } \mu_m) \quad \text{Eq. 3}$$

where $f_m$ is the predicted category for each DNN model, $\mu_m$ is the mean predicted category for each DNN model, and $x_K$ is the Kalman filter state prediction for mixed-precision DNN ensemble 300.

In an illustrative example, M equals 5 and mixed-precision DNN ensemble 300 includes DNN primary module 310 and four DNN auxiliary modules 320, i.e., DNN auxiliary modules $\mathbf{320}^1$, $\mathbf{320}^2$, $\mathbf{320}^3$ and $\mathbf{320}^4$ (not depicted for clarity). In this example, mixed-precision DNN ensemble 300 is designed to predict the weather, and, more specifically, the temperature. Input data are presented to mixed-precision DNN ensemble 300 as a tensor that includes measured temperature values (i.e., y dimension) over time (i.e., x dimension) and sensor channel (i.e., z dimension).

DNN primary module 310 generates predicted class or category $f_1$, mean temperature $\mu_1$ and temperature variance $\sigma_1^2$, DNN auxiliary module $\mathbf{320}^1$ generates predicted class or category $f_2$, mean temperature $\mu_2$ and temperature variance $\sigma_2^2$, DNN auxiliary module $\mathbf{320}^2$ generates predicted class or category $f_3$, mean temperature $\mu_3$ and temperature variance 632, DNN auxiliary module $\mathbf{320}^3$ generates predicted class or category $f_4$, mean temperature $\mu_4$ and temperature variance $\sigma_4^2$, and DNN auxiliary module $\mathbf{320}^4$ generates predicted class or category $f_5$, mean temperature $\mu_5$ and temperature variance $\sigma_5^2$, as depicted in Table 1. In this embodiment, there are 30 categories, numbered 1 to 30, each one associated with a temperature from 30.0° C. to 32.9° C. in increments of 0.1° C.

TABLE 1

| m | Category $f_i$ | Mean Temperature $\mu_i$ | Temperature Variance $\sigma_i^2$ |
|---|---|---|---|
| 1 | 16 | 31.5° C. | 0.1 |
| 2 | 11 | 31.0° C. | 0.6 |
| 3 | 21 | 32.0° C. | 0.6 |
| 4 | 14 | 31.3° C. | 0.3 |
| 5 | 13 | 31.2° C. | 0.5 |

In this example, the average predicted category, i.e., $f_*$, is category 15, which corresponds to a temperature of 31.4° C., the average mean predicted category and average variance, i.e., $\mu_*$ and $\sigma_*^2$, are 31.4° C. and 0.536, respectively, and the Kalman filter state prediction $x_*$ is 31.5° C., as depicted in Table 2.

TABLE 2

| | Temperature | Temperature Variance |
|---|---|---|
| f* | Category 15 (31.4° C.) | |
| μ* | 31.4° C. | |
| $\sigma^{*2}$ | | 0.536 |
| X* | 31.5° C. | |

In this example, mixed-precision DNN ensemble 300 advantageously provides an indication of uncertainty associated with the temperature prediction, reflected, for example, by the average variance $\sigma_*^2$. When the average variance $\sigma_*^2$ is within a certain range, e.g., 0 to 0.6, then the accuracy of the temperature prediction may be relied upon. Conversely, when the average variance $\sigma_*^2$ is outside a certain range, e.g., greater than 0.6, then the accuracy of the temperature prediction may not be relied upon.

Figure 5:
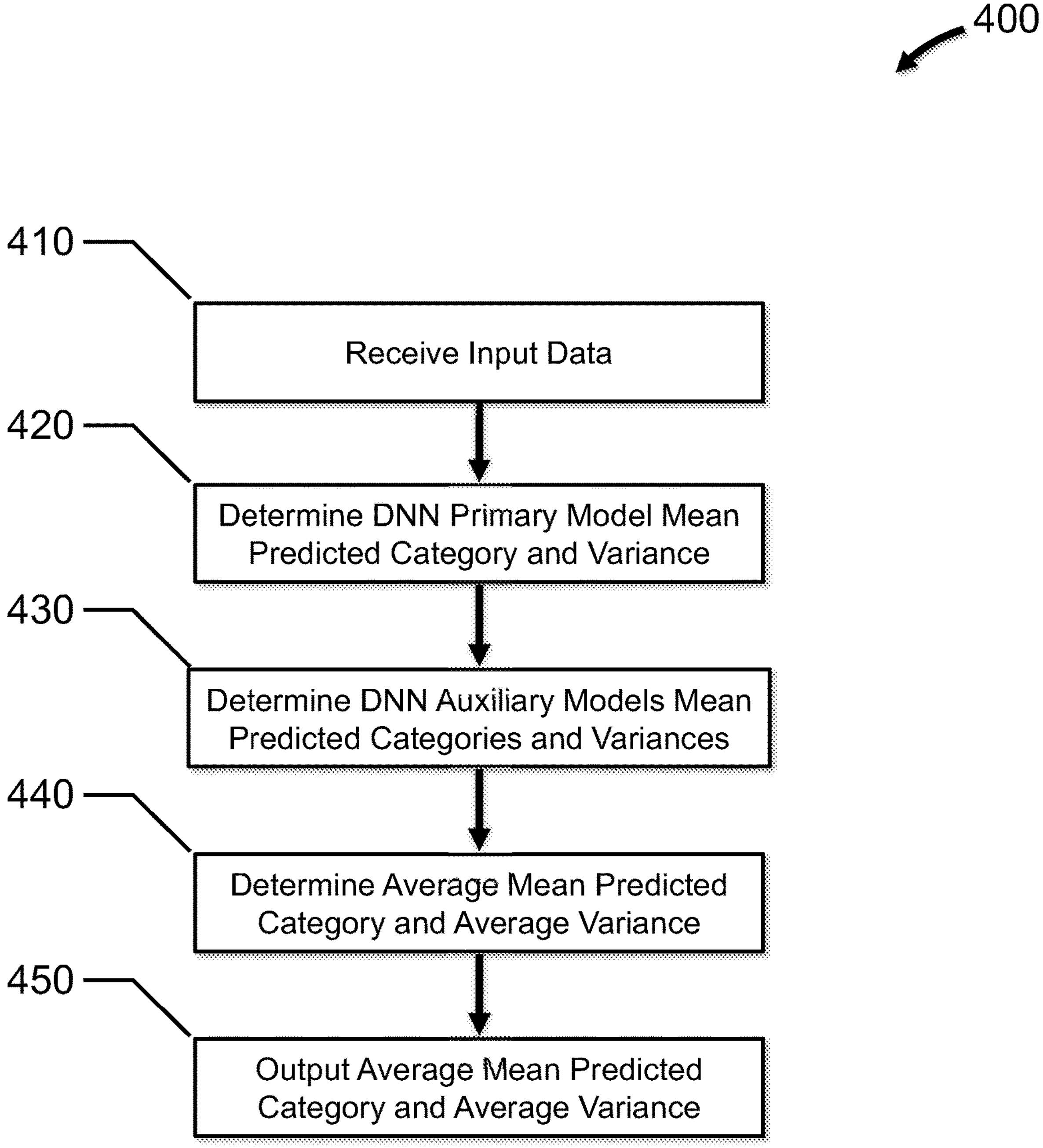
FIG. 5 depicts a flow diagram representing functionality associated with a mixed-precision DNN ensemble, in accordance with an embodiment of the present disclosure.

FIG. 5 depicts a depict flow diagram 400 representing functionality associated with a mixed-precision DNN ensemble, in accordance with an embodiment of the present disclosure.

At 410, input data is received by DNN primary module 310 and a number of DNN auxiliary modules 320. DNN primary module 310 includes a DNN primary model with a primary precision level. Each DNN auxiliary module 320 includes a DNN auxiliary model with an auxiliary precision level less than the primary precision level.

At 420, a mean predicted category and a variance is determined, by the DNN primary model, based on the input data.

At 430, a mean predicted category and a variance is determined, by each DNN auxiliary model, based on the input data.

At 440, an average mean predicted category and an average variance is determined, by fusion module 330, based on the mean predicted categories and the variances received from the DNN primary model and the DNN auxiliary models.

At 450, the average mean predicted category and the average variance are output by fusion module 330.

The embodiments described herein are combinable.

In one embodiment, a hardware accelerator for a mixed-precision deep neural network (DNN) ensemble includes a DNN primary module, a number of DNN auxiliary modules and a fusion module coupled to the DNN primary module and the DNN auxiliary modules. The DNN primary module processes a DNN primary model having a primary precision level, and is configured to determine a mean predicted category and a variance based on input data, and to output the mean predicted category and the variance. Each DNN auxiliary module processes a DNN auxiliary model having an auxiliary precision level less than the primary precision level, and is configured to determine a mean predicted category and a variance based on the input data, and to output the mean predicted category and the variance. The fusion module is configured to receive, from the DNN primary module and the DNN auxiliary modules, the mean predicted categories and the variances, determine an average mean predicted category and an average variance based on the mean predicted categories and the variances, and output the average mean predicted category and the average variance.

In another embodiment of the hardware accelerator, the primary precision level is N bits and the auxiliary precision level is n bits.

In another embodiment of the hardware accelerator, N is 2, 4, 8, 16, 32 or 64, and n is 2, 4, 8, 16 or 32.

In another embodiment of the hardware accelerator, n equals N divided by 2.

In another embodiment of the hardware accelerator, the average mean predicted category is given by:

$$\mu_* = \frac{1}{M} \times \sum_{m=1}^{M} \mu_m,$$

where M is a total number of DNN models that equals the number of DNN auxiliary modules plus 1, $\mu_*$ is the average mean predicted category, and $\mu_m$ is the mean predicted category for each DNN model.

In another embodiment of the hardware accelerator, the average variance is given by:

$$\sigma_*^2 = \frac{1}{M} \times \sum_{m=1}^{M} (\sigma_m^2 + \mu_m^2) - \mu_*^2,$$

where $$\sigma_*^2$$

is the average variance, and $$\sigma_m^2$$

is the variance for each DNN model.

In another embodiment of the hardware accelerator, the DNN primary model includes an input layer, a number of hidden layers and an output layer including a first output node generating the mean predicted category and a second output node generating the variance; each DNN auxiliary model includes an input layer, a number of hidden layers and an output layer including a first output node generating a mean predicted category and a second output node generating a variance; and the number of DNN auxiliary model hidden layers is the same as the number of DNN primary model hidden layers.

In another embodiment of the hardware accelerator, a number of nodes in each DNN auxiliary model hidden layer is the same as a number of nodes in each corresponding DNN primary model hidden layer.

In another embodiment of the hardware accelerator, the DNN primary model and the DNN auxiliary models are randomly initialized with different sets of parameters.

In one embodiment, a method for a mixed-precision deep neural network (DNN) ensemble includes receiving, by a DNN primary module and a number of DNN auxiliary modules, input data, the DNN primary module including a DNN primary model having a primary precision level, each DNN auxiliary module including a DNN auxiliary model having an auxiliary precision level less than the primary precision level; determining, by the DNN primary model, a mean predicted category and a variance based on the input data; determining, by each DNN auxiliary model, a mean predicted category and a variance based on the input data; determining, by a fusion module, an average mean predicted category and an average variance based on the mean predicted categories and the variances received from the DNN primary model and the DNN auxiliary models; and outputting, by the fusion module, the average mean predicted category and the average variance.

In another embodiment of the method, the primary precision level is N bits and the auxiliary precision level is n bits.

In another embodiment of the method, N is 2, 4, 8, 16, 32 or 64, and n is 2, 4, 8, 16 or 32.

In another embodiment of the method, n equals N divided by 2.

In another embodiment of the method, the average mean predicted category is given by:

$$\mu_* = \frac{1}{M} \times \sum_{m=1}^{M} \mu_m,$$

where M is a total number of DNN models that equals the number of DNN auxiliary modules plus 1, $\mu_*$ is the average mean predicted category, and $\mu_m$ is the mean predicted category for each DNN model.

In another embodiment of the method, the average variance is given by:

$$\sigma_*^2 = \frac{1}{M} \times \sum_{m=1}^{M} (\sigma_m^2 + \mu_m^2) - \mu_*^2,$$

where $$\sigma_*^2$$

is the average variance, and $$\sigma_m^2$$

is the variance for each DNN model.

In another embodiment of the method, the DNN primary model includes an input layer, a number of hidden layers and an output layer including a first output node generating the mean predicted category and a second output node generating the variance; each DNN auxiliary model includes an input layer, a number of hidden layers and an output layer including a first output node generating a mean predicted category and a second output node generating a variance; and the number of DNN auxiliary model hidden layers is the same as the number of DNN primary model hidden layers.

In another embodiment of the method, a number of nodes in each DNN auxiliary model hidden layer is the same as a number of nodes in each corresponding DNN primary model hidden layer.

In another embodiment of the method, the DNN primary model and the DNN auxiliary models are randomly initialized with different sets of parameters.

In one embodiment, a further method for a mixed-precision deep neural network (DNN) ensemble includes receiving, by a DNN primary module and a number of DNN auxiliary modules, input data, the DNN primary module including a DNN primary model having a primary precision level, each DNN auxiliary module including a DNN auxiliary model having an auxiliary precision level less than the primary precision level; determining, by the DNN primary model, a predicted category, f based on the input data; determining, by each DNN auxiliary model, a predicted category, f based on the input data; determining, by a fusion module, an average predicted category, $f_*$, or a Kalman filter state prediction, $x_K$, based on the predicted categories, f, received from the DNN primary model and the DNN auxiliary models; and outputting, by the fusion module, the average predicted category, $f_*$, or the Kalman filter state prediction, $x_K$.

In another embodiment of the further method, the primary precision level is N bits, and N is 2, 4, 8, 16, 32 or 64; and the auxiliary precision level is n bits, and n is 2, 4, 8, 16 or 32.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A hardware accelerator for a mixed-precision deep neural network (DNN) ensemble, comprising:

a DNN primary module including hardware configured to receive input data and to process a DNN primary model having a primary precision level having a precision of N bits, the DNN primary model configured to determine a mean predicted category and a variance based on input data, the DNN primary module configured to output the mean predicted category and the variance;

a number of DNN auxiliary modules, each DNN auxiliary module including hardware configured to receive the same input data as the DNN primary module and to process a DNN auxiliary model having an auxiliary precision level less than N bits, each DNN auxiliary model configured to determine a mean predicted category and a variance based on the same input data as that received by the DNN primary module, each DNN auxiliary module configured to output the mean predicted category and the variance; and a fusion module, comprising hardware coupled to the DNN primary module and the DNN auxiliary modules, configured to:

receive, from the DNN primary module and the DNN auxiliary modules, the mean predicted categories and the variances, determine an average mean predicted category and an average variance based on the mean predicted categories and the variances, and output the average mean predicted category and the average variance.

2. The hardware accelerator according to claim 1, where weights and activations of the DNN primary model are N-bit elements.

3. The hardware accelerator according to claim 1, wherein each DNN auxiliary model has an auxiliary precision level of n bits, where Nis 2, 4, 8, 16, 32 or 64, and n is 2, 4, 8, 16 or 32.

4. The hardware accelerator according to claim 3, where n equals N divided by 2.

5. The hardware accelerator according to claim 1, where the average mean predicted category is given by:

$$\mu_* = \frac{1}{M} \times \sum_{m=1}^{M} \mu_m,$$

where M is a total number of DNN models that equals the number of DNN auxiliary modules plus 1, $\mu_*$ is the average mean predicted category, and $\mu_m$ is the mean predicted category for each DNN model.

6. The hardware accelerator according to claim 1, where the average variance is given by:

$$\sigma_*^2 = \frac{1}{M} \times \sum_{m=1}^{M} (\sigma_m^2 + \mu_m^2) - \mu_*^2,$$

where $$\sigma_*^2$$

is the average variance, and $$\sigma_m^2$$

is the variance for each DNN model.

7. The hardware accelerator according to claim 1, where:

the DNN primary model includes an input layer, a number of hidden layers and an output layer including a first output node generating the mean predicted category and a second output node generating the variance;

each DNN auxiliary model includes an input layer, a number of hidden layers and an output layer including a first output node generating a mean predicted category and a second output node generating a variance; and the number of DNN auxiliary model hidden layers is the same as the number of DNN primary model hidden layers.

8. The hardware accelerator according to claim 7, where a number of nodes in each DNN auxiliary model hidden layer is the same as a number of nodes in each corresponding DNN primary model hidden layer.

9. The hardware accelerator according to claim 8, where the DNN primary model and the DNN auxiliary models are randomly initialized with different sets of parameters.

10. A method for a mixed-precision deep neural network (DNN) ensemble, comprising:

receiving, by a DNN primary module and a number of DNN auxiliary modules, input data, the DNN primary module including hardware configured to implement a DNN primary model having a primary precision level of N bits, each DNN auxiliary module including hardware configured to implement a DNN auxiliary model having an auxiliary precision level less than N bits;

determining, by processing the DNN primary model in the DNN primary module, a mean predicted category and a variance based on the input data;

determining, by processing each DNN auxiliary model in a corresponding DNN auxiliary module, a mean predicted category and a variance based on the same input data as received by the DNN primary module;

determining, by a fusion module coupled to the DNN primary module and the DNN auxiliary modules, an average mean predicted category and an average variance based on the mean predicted categories and the variances received from the DNN primary model and the DNN auxiliary models; and outputting, by the fusion module, the average mean predicted category and the average variance.

11. The method according to claim 10, where weights and activations of the DNN primary model are N-bit elements.

12. The method according to claim 10, where the auxiliary precision level is n bits and where Nis 2, 4, 8, 16, 32 or 64, and n is 2, 4, 8, 16 or 32.

13. The method according to claim 12, where n equals N divided by 2.

14. The method according to claim 10, where the average mean predicted category is given by:

$$\mu_* = \frac{1}{M} \times \sum_{m=1}^{M} \mu_m,$$

where M is a total number of DNN models that equals the number of DNN auxiliary modules plus 1, $\mu_*$ is the average mean predicted category, and $\mu_m$ is the mean predicted category for each DNN model.

15. The method according to claim 14, where the average variance is given by:

$$\sigma_*^2 = \frac{1}{M} \times \sum_{m=1}^{M} (\sigma_m^2 + \mu_m^2) - \mu_*^2,$$

where $$\sigma_*^2$$

is the average variance, and $$\sigma_m^2$$

is the variance for each DNN model.

16. The method according to claim 10, where:

the DNN primary model includes an input layer, a number of hidden layers and an output layer including a first output node generating the mean predicted category and a second output node generating the variance;

each DNN auxiliary model includes an input layer, a number of hidden layers and an output layer including a first output node generating a mean predicted category and a second output node generating a variance; and the number of DNN auxiliary model hidden layers is the same as the number of DNN primary model hidden layers.

17. The method according to claim 16, where a number of nodes in each DNN auxiliary model hidden layer is the same as a number of nodes in each corresponding DNN primary model hidden layer.

18. The method according to claim 17, where the DNN primary model and the DNN auxiliary models are randomly initialized with different sets of parameters.

19. A method for a mixed-precision deep neural network (DNN) ensemble, comprising:

receiving, by a DNN primary module and a number of DNN auxiliary modules, input data, the DNN primary module configured to implement a DNN primary model having a primary precision level of N bits, each DNN auxiliary module configured to implement a DNN auxiliary model having an auxiliary precision level less than N bits;

determining, by executing the DNN primary model in the DNN primary module, a predicted category, f, based on the input data;

determining, by executing each DNN auxiliary model in a corresponding DNN auxiliary module, a predicted category, f, based on the same input data as received by the DNN primary module;

determining, by a fusion module coupled to the DNN primary and the module DNN auxiliary module, an average predicted category, $f_*$, or a Kalman filter state prediction, $x_K$, based on the predicted categories, f, received from the DNN primary model and the DNN auxiliary models; and outputting, by the fusion module, the average predicted category, f, or the Kalman filter state prediction, $x_K$.

20. The method according to claim 19, where:

the primary precision level is N bits, and Nis 2, 4, 8, 16, 32 or 64; and the auxiliary precision level is n bits, and n is 2, 4, 8, 16 or 32.

* * * * *